US012663294B2

(12) United States Patent
Melvin et al.

(10) Patent No.: US 12,663,294 B2
(45) Date of Patent: Jun. 23, 2026

(54) SELF-TESTING FIRE DOOR

(71) Applicant: Harmony Fire Ltd., Yeovil (GB)

(72) Inventors: Jake Melvin, Yeovil (GB); Warwick Melvin, Yeovil (GB)

(73) Assignee: Harmony Fire Ltd., Yeovil (GB)

( * ) Notice: Subject to any disclaimer, the term of this patent is extended or adjusted under 35 U.S.C. 154(b) by 0 days.

(21) Appl. No.: 18/102,540

(22) Filed: Jan. 27, 2023

(65) Prior Publication Data

US 2023/0243671 A1 Aug. 3, 2023

(30) Foreign Application Priority Data

Jan. 28, 2022 (GB) ..................................... 2201129

(51) Int. Cl.

*E06B 5/16* (2006.01)
*A62C 2/12* (2006.01)
*G01D 5/14* (2006.01)

(52) U.S. Cl.

CPC ............... *G01D 5/145* (2013.01); *A62C 2/12* (2013.01); *E06B 5/16* (2013.01)

(58) Field of Classification Search

CPC ............ E06B 5/16; G01D 5/145; A62C 37/50
See application file for complete search history.

(56) References Cited

U.S. PATENT DOCUMENTS

| | | | | |
|---|---|---|---|---|
| 11,074,795 | B1 * | 7/2021 | Neidigk | G01V 3/10 |
| 11,648,431 | B2 * | 5/2023 | Piech | A62C 35/023 169/61 |
| 2010/0218569 | A1 * | 9/2010 | Hunt | E05B 65/108 70/276 |

FOREIGN PATENT DOCUMENTS

| | | | | | |
|---|---|---|---|---|---|
| CN | 203034971 | U | | 7/2013 | |
| CN | 106088995 | B | * | 1/2018 | G08B 13/06 |
| CN | 110853269 | A | | 2/2020 | |
| CN | 213024755 | U | | 4/2021 | |
| DE | 102012217098 | A1 | * | 3/2014 | G08B 13/08 |
| EP | 3 287 584 | A1 | | 2/2018 | |
| EP | 2 711 905 | B1 | | 3/2019 | |
| WO | WO-2021198313 | A1 | * | 10/2021 | |

OTHER PUBLICATIONS

English translation of DE102012217098A1 from espacenet (Year: 2014).*

(Continued)

*Primary Examiner* — Muhammad Ijaz
*Assistant Examiner* — Susan M. Heschel
(74) *Attorney, Agent, or Firm* — Foley & Lardner LLP

(57) ABSTRACT

Once a fire door has been installed, the door will typically require regular inspection to ensure that the fire door is still able to operate as intended. An issue typically seen with fire doors is related to the gaps between the door and the frame that being too large. The present disclosure provides a self-testing fire door system comprising a first distance sensor arranged to measure a first distance between a fire door and a door frame. The first distance sensor comprises a first sensor member arranged on the door frame and a second sensor member arranged on the fire door adjacent to the first sensor member when the fire door is in a closed position. The system further includes a processor configured to measure, via the first distance sensor, a distance between the fire door and the frame and output the first distance.

14 Claims, 5 Drawing Sheets

(56) References Cited

OTHER PUBLICATIONS

CN106088995 English Translation from WIPO (Year: 2018).*
UK Intellectual Property Office Search Report on Application GB2201129.0, dated Jul. 22, 2022 (4 pages).
Extended European Search Report on EPO Application 23152892.8 dated Jun. 27, 2023 (11 pages).
Texas Instruments: "Intro to 3D Hall-effect sensors", Apr. 14, 2021 (Apr. 14, 2021), XP93054612, Retrieved from the Internet: URL:https://www.youtube.com/watch?v=XgkPuUWP9Yk [retrieved on Jun. 15, 2023].
GB Examination Report for Application No. 2201129.0 mailing date Apr. 17, 2025, 7 pages.

* cited by examiner

SELF-TESTING FIRE DOOR

CROSS-REFERENCE TO RELATED APPLICATIONS

This application claims the benefit of priority to Great Britain Patent Application No. 2201129.0, filed Jan. 28, 2022, which is hereby incorporated by reference in its entirety.

FIELD OF THE DISCLOSURE

The present disclosure relates to a fire door and finds particular, although not exclusive, utility in providing a self-testing fire door.

BACKGROUND

A fire door is a door that is able to withstand a fire to a greater degree when compared to typical doors. Fire doors are used as part of a passive fire protection system to reduce the spread of fire and smoke between areas separated by the fire door. Once a fire door has been installed, the door will typically require regular inspection to ensure that the fire door is still able to operate as intended. If a problem with a fire door is identified, the fire door may be fixed or replaced as appropriate.

An issue typically seen with fire doors is related to the gaps between the door and the frame that being too large. In use and over time, a door may settle, sag or move in other ways such that the door tolerances set during installation are no longer present. The role of a surveyor would be to measure the gaps and ensure that they fall within the allowable tolerances, and to have the door adjusted or replaced if the gaps are too large.

However, due to cost and availability of qualified surveyors, fire doors are typically inspected only once a year. Accordingly, a problem with a fire door may go unnoticed for up to a year, reducing the effectiveness of the passive fire protection system. Additionally, as inspections are typically carried out manually, the process is open to human error.

Therefore, it is desirable to provide a fire door system to alleviate at least these problems. Objects and aspects of the present disclosure seek to provide a fire door system able to alleviate or solve these problems.

SUMMARY

According to a first aspect of the present disclosure, there is provided a self-testing fire door system comprising: a door frame; a fire door attached to the door frame via one or more hinges, wherein the fire door is moveable between a closed position, in which the fire door covers an opening in the door frame, and an open position, in which the opening in the door frame is uncovered; a first distance sensor arranged to measure a first distance between the fire door and the door frame, wherein the first distance sensor comprises a first sensor member arranged on the door frame and a second sensor member arranged on the fire door adjacent to the first sensor member when the fire door is in the closed position; and a processor configured to: measure, via the first distance sensor, the first distance; and output the first distance, wherein the first distance sensor comprises three Hall effect sensors arranged such that each Hall effect sensor is aligned along different axes to each of the other Hall effect sensors in a triaxial arrangement.

In this way, the first distance sensor may be used to remotely measure a distance between the fire door and the door frame.

The fire door may comprise an intumescent material configured to seal a gap between the fire door and the door frame in the event of a fire. Accordingly, the distance between the fire door and the door frame must be kept within an allowable range for the intumescent material to operate as intended.

The processor may be a local processor or a networked processor. A single processor may be shared across a plurality of fire door systems. The processor may be in communication with a server. The server and/or processor may be accessed remotely.

The door frame being uncovered may mean that the door is open and that a person may pass through the door frame.

The system may further comprise a second distance sensor. The second door sensor may be arranged to measure a second distance between the fire door and the door frame. The second distance sensor may comprise a first sensor member arranged on the door frame and a second sensor member arranged on the fire door adjacent to the first sensor member when the fire door is in the closed position. In this way, the system may be used to measure the distance between the fire door and the door frame at two points. As such, the system may measure the distance along two axes. Monitoring two distances between the door and the frame may allow for the detection of warp or twist in the door or frame.

The first distance sensor and the second distance sensor may be in communication via a hardwired connection. The first distance sensor and the second distance sensor may be configured to share power and/or data via the hardwired connection. The hardwired connection may pass internally of the door, for protection. In this way, only a single sensor may require a power source and/or data logging or data communication properties. The first distance sensor may be a node sensor and the second distance sensor may be an auxiliary sensor. In this way, the first distance sensor may control operation of the second distance sensor. Each further distance sensor may be arranged and communicate with the first distance sensor in the same manner as the second distance sensor.

The system may further comprise a third distance sensor arranged to measure a third distance between the fire door and the door frame. The third distance sensor comprises a first sensor member arranged on the door frame and a second sensor member arranged on the fire door adjacent to the first sensor member when the fire door is in the closed position.

The second and/or third distance sensor(s) may include each of the features of the first distance sensor. Fourth, fifth, or any number of further distance sensors may be provided.

The first distance may be a distance 162 between a first surface of the fire door and the frame. The second distance may be a distance 163 between a second surface of the fire door and the frame. The third distance may be a distance between a third surface of the fire door and the frame. In this way, the clearances around each side of the door may be measured.

Alternatively, the first distance may be a first distance 162 between a first surface of the fire door and the frame, and the second distance may be a second distance 164 between the first surface of the fire door and the frame. In this way, the distance between a single side of the fire door and the door frame may be measured. The distance between the fire door and the door frame may not be uniform along a side of the fire door, particularly if the door has dropped or sagged.

The processor may be configured to output the first distance is response to the fire door moving to the closed position. The fire door may be biased towards the closed position. The system may comprise a closure sensor configured to provide an output when the door is moved to the closed position. In this way, the first distance may be measured each time the door is used and closed.

Additionally or alternatively, the system may comprise an inertial measurement unit. The inertial measurement unit may be operable to detect the movement of the fire door. The inertial measurement unit may be used to determined when a door is opened and then returned to the closed position wherein the door is stationary.

Some fire doors are designed such that they should not be propped open. If the inertial measurement unit detects the fire door is stationary but the fire door is not in the closed position, the system may output an alert that the door is stuck in an open position. The system may comprise an alarm configured to sound, flash, or otherwise alert a user that the fire door is stuck open. The system may output the alert that the door is stuck open only after a predetermined period has passed, such as 10 seconds, 15 seconds, 20 seconds, 1 minute, 5 minutes, or any other suitable time. The alert may be sent to a user's personal computing device, such as a smartphone, personal computer, or any other known device.

Some fire doors are designed to operate such that they are typically arranged in a hold open state, and are released and allowed to close in the event of a fire alarm operating. In this arrangement, the fire door may be closed irregularly or not at all, such that the opportunity to test the fire door is limited. The system may be arranged such that the distance sensors are set in a configuration. The system may be configured to provide an output indicating that the door should be closed to allow for testing of the fire door. Such an output may be provided periodically such that the user is notified to close the door and allow for the door to be tested. The maximum allowed period between door tests may be settable by the user. The system may comprise an alarm configured to sound, flash, or otherwise alert a user that the fire door should be closed for testing. The output may be sent to a user's personal computing device, such as a smartphone, personal computer, or any other known device. Furthermore, the system may be configured to provide a notification and verification that the door is closed when the alarm is in operation. In this way, a user may remotely verify that the fire door is closed as intended.

The processor may comprise a time keeping unit. The processor may be configured to output the first distance after a predetermined time interval. The processor may be configured to continually output the first distance at regular time intervals. In this way, the distance between the door frame and the fire door may be measured even if the door remains unused. The predetermined time interval may be any suitable time, such as 1 second, 5 seconds, 15 seconds, 30 seconds, 1 minute, 5 minutes, 15 minutes, 30 minutes, 1 hour, 4 hours, 6 hours, 12 hours or 24 hours.

The processor may be configured to output the first distance to an alert unit. The alert unit may be configured to compare the first distance to a predetermined maximum allowable first distance and output an alert if the first distance exceeds the predetermined maximum allowable first distance. In this way, a user may be alerted that the fire door requires manual inspection and/or maintenance. The predetermined maximum allowable first distance may be user settable and/or resettable. Each of the other distances and sensors may also be configured and/or arranged similarly to the first distance and sensor.

The processor may be configured to keep a log of each measurement of the first distance. Such a log may be useful for audit or review purposes. Additionally, the log of each measurement may be used to determine a trend. For example, the measured distance may be increasing over time. The trend may be used to predict a date on which the measured distance will exceed a predetermined maximum allowable distance. Maintenance or inspection may be scheduled prior to the predicted date such that the aim is that the measured distance is maintained below the maximum allowable distance. The processor may be Internet-enabled. In this way, a user may communicate with the processor, and access data stored or processed by the processor, via the Internet. The log may therefore be remotely accessible.

The first distance sensor may comprise an analogue to digital converter. Accordingly, the Hall effect sensors may provide a value proportional to the distance between the fire door and the door frame. The Hall effect sensors may each be combined into a single integrated circuit. In this way, distances along three axes may be obtained. Alternatively, the processor may be configured to calculate a distance between the fire door and the door frame in three dimensions based on triangulation of the signals from the three Hall effect sensors. The distances may be calculated using vector formulae, conversion formulae and/or a look-up table. The relative positions of the Hall effect sensors may be predetermined. Each distance sensor may comprise three Hall effect sensors.

The system may further comprise a power source. The power source may be configured to provide power to the first distance sensor and the processor. The power source may also be configured to provide power to any other powered component in the system. The power source may comprise a battery, a capacitor, a mains electricity adapter, and/or any other known power source. The power source may be replaceable and/or rechargeable. The power source may comprise an uninterruptible power supply such that power is continuously provided to the system components. The power source may comprise a battery having a battery life of at least 1 year, 2 years, 3 years, 4 years, or 5 years. In this way, the battery may require replacement and/or recharging less often.

The system may further comprise a hub in communication with the processor. The hub may be configured to communicate with further processors of further self-testing fire door systems. In this way, a central hub may be used to control and/or communicate with a plurality of fire door systems. For example, each fire door in a building or complex of buildings may be a self-testing fire door system as disclosed herein. The single hub may be in communication with each of the fire door systems. A user may communicate with the hub, directly or indirectly via a server or otherwise, to monitor and/or receive data from each of the fire door systems. The hub may communicate with the one or more systems over a radio frequency or any other known frequency. The hub may have a minimum range of 50 m, 100 m, 125 m, 150 m, or any other desirable distance. The alert system disclosed herein may operate via the hub.

A cyclic redundancy check, or other checksum, may be sent along with data to the hub. When the hub receives data, the hub may respond with the cyclic redundancy check value. Accordingly, the accuracy of data transfer may be verified. The system may comprise an indicator configured to indicate when successful data transfer has occurred. For example, an LED may be positioned on the door or frame and may be configured to flash or otherwise notify a user when successful data transfer has occurred. The indicator may be configured to indicate when data transfer has been unsuccessful. For example, the LED may flash a different colour or pattern when data transfer has been unsuccessful. In one example, the LED may flash green each time data is successfully transferred, flash red each time data transfer is unsuccessful, and constantly display red if there is no connection between the processor and the hub.

The first distance sensor may have an operational range of less than 50 mm, 40 mm, 30 mm, 20 mm, or any other desirable distance. The first distance sensor may have a minimum operational range, such as 10 mm, 8 mm, 6 mm, 5 mm, or any other desirable distance. Preferably, the first distance sensor has an operational range of between 5 mm and 20 mm. The first distance sensor may have a resolution of less than 0.1 mm, 0.09 mm, 0.08 mm, 0.07 mm, 0.06 mm, 0.05 mm or any other desirable resolution. In this way, relatively accurate distance measurements may be obtained. Each of the other distance sensors may be configured and/or arranged in a similar manner to the first distance sensor.

According to a second aspect of the present disclosure, there is provided a method of testing the fire door system of the first aspect, the method comprising: measuring the first distance; and comparing the first distance to a predetermined maximum allowable first distance.

Any feature disclosed with reference to the first aspect may apply equally to the second aspect.

DETAILED DESCRIPTION

Figure 1A:
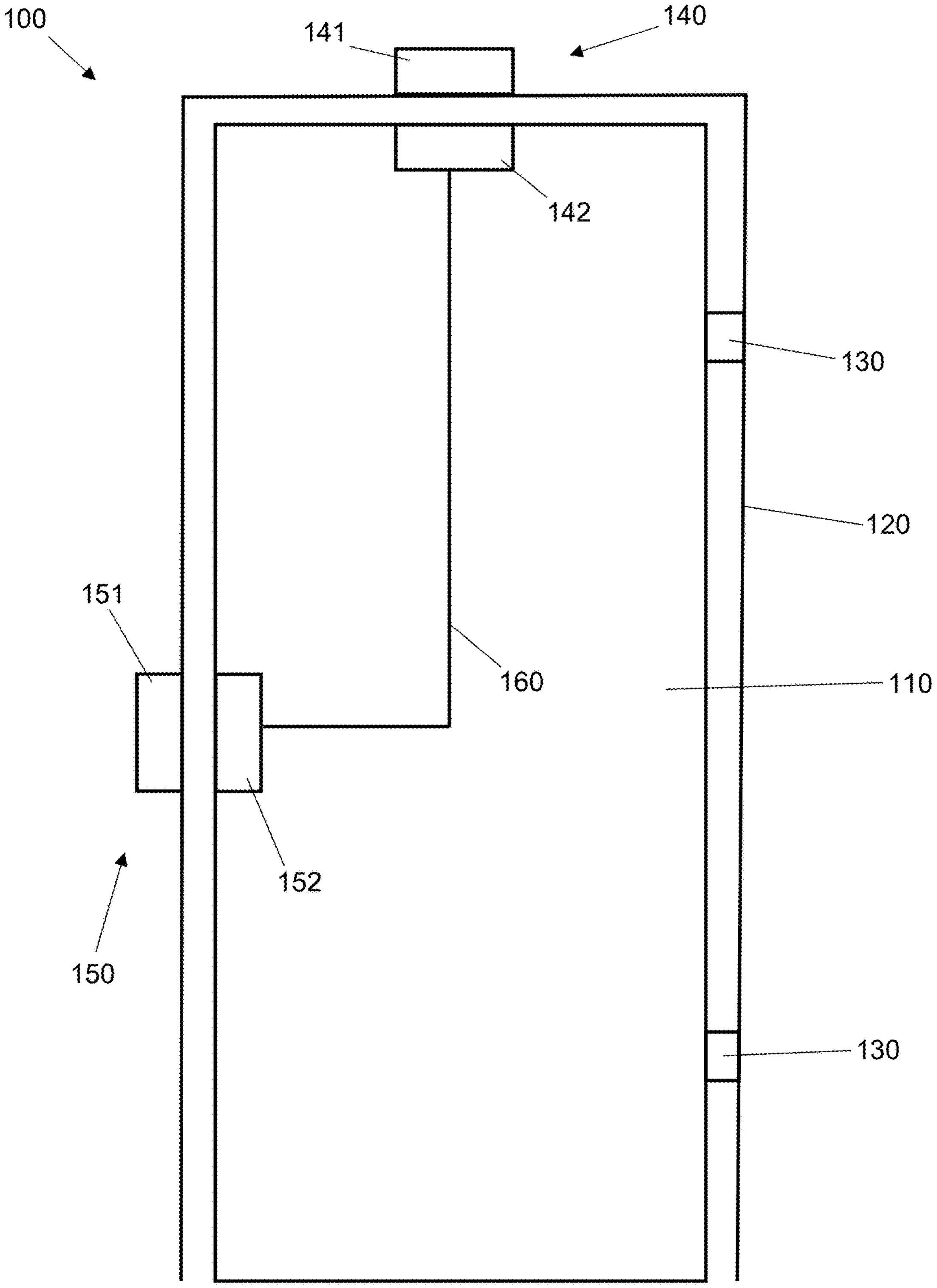
FIGS. 1A and 1B are schematic diagrams of a self-testing fire door system.
Figure 1B:
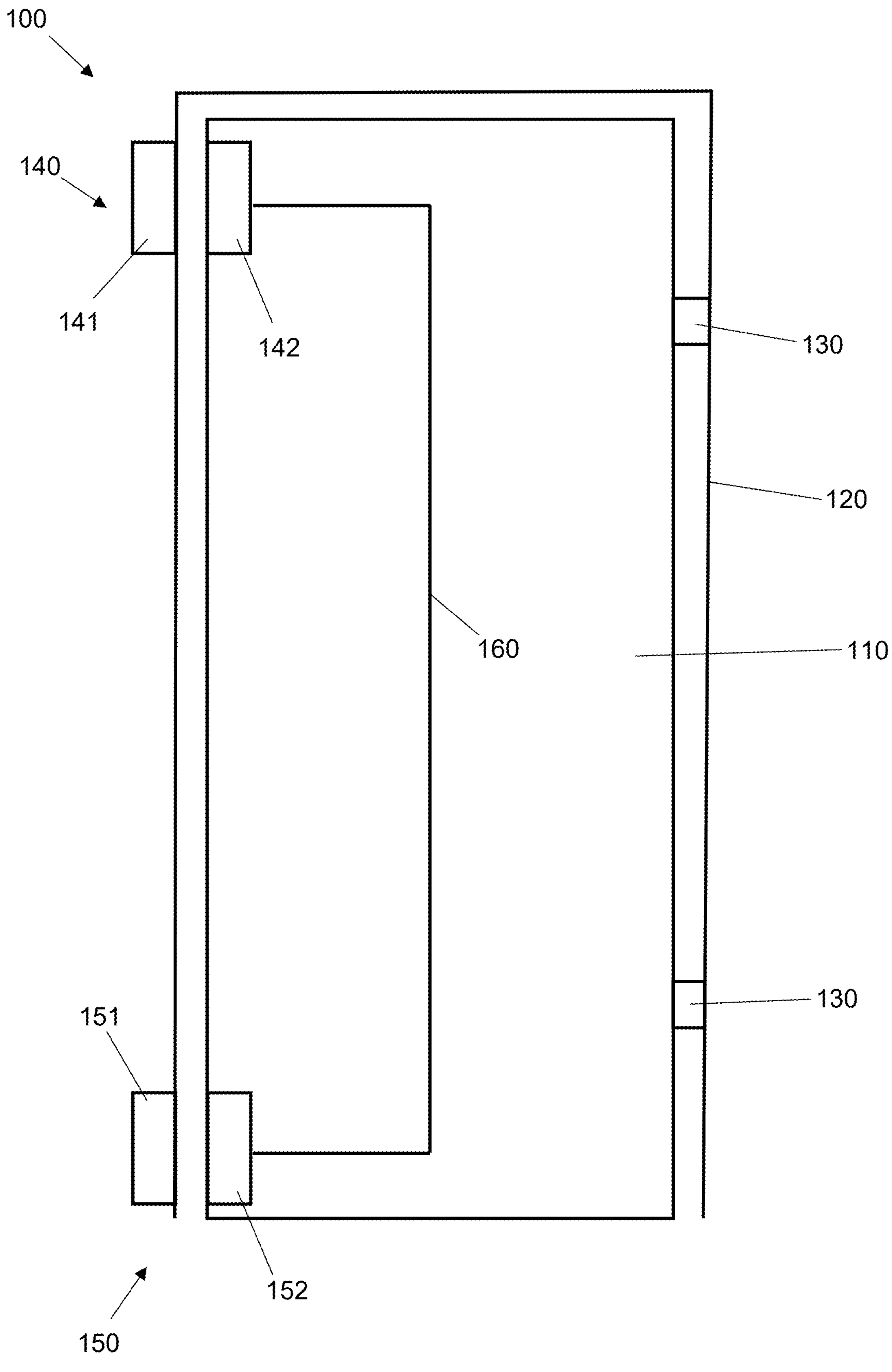

FIGS. 1A and 1B are schematic diagrams of a self-testing fire door system 100. The system 100 includes a fire door 110 hung within a frame 120 via hinges 130. Although only two hinges 130 are shown, any number of hinges may be provided, and the number of hinges 130 may be dependent on a weight of the door 110. The door 110, the frame 120 and the hinges 130 are fire rated and are configured to withstand a fire for a specified period of time, such as 30, 60 or 90 minutes, such that a fire cannot pass through the system 100 at least until the period of time has elapsed. A sealing strip (not shown), such as a strip of intumescent material, may be provided between the door 110 and the frame 120 to seal the operational gap between the door 110 and the frame 120 in the event of a fire.

The self-testing fire door system 100 also includes a first distance sensor 140 and a second distance sensor 150. The first distance sensor 140 is arranged at a top edge of the door 110 and is configured to measure a distance between the top edge of the door 110 and a top portion of the frame 120. The first distance sensor 140 includes a first frame sensor member 141 and a first door sensor member 142. The first frame sensor member 141 and the first door sensor member 142 cooperate to measure a distance therebetween. The second distance sensor 150 is arranged at a left edge of the door 110 and is configured to measure a distance between the left edge of the door 110 and a left portion of the frame 120. The second distance sensor 150 includes a second frame sensor member 151 and a second door sensor member 152. The second frame sensor member 151 and the second door sensor member 152 cooperate to measure a distance therebetween. Further distance sensors, such as third or fourth distance sensors, may also be provided. The further distance sensors may be arranged to measure a distance between, for example, a right edge of the door 110 and a right portion of the frame 120, and/or to provide a second measurement alongside the first distance sensor 140 or the second distance sensor.

One of the first frame sensor member 141 and the first door sensor member 142, preferably the first frame sensor member 141, may comprise a magnet. The other of the first frame sensor member 141 and the first door sensor member 142, preferably the first door sensor member 142, may comprise three Hall effect sensors. Accordingly, triangulation of the signals provided by the three Hall effect sensors will provide a triaxial measurement of the distance between the first frame sensor member 141 and the first door sensor member 142. The second distance sensor 150, and any further distance sensors, may be configured in the same way as the first distance sensor 140. Alternative distance sensor arrangements are envisaged, such as optical distance sensors.

The first door sensor member 142 and the second door sensor member 152 are in communication via a hardwired connection 160. The hardwired connection 160 allows for power and data to be shared between the two door sensor members 142, 152. Accordingly, one of the distance sensors, such as the first distance sensor 140, may be a node sensor and the other distance sensor, such as the second distance sensor 150, may be an auxiliary sensor. Any further distance sensors provided may also be auxiliary sensors. Accordingly, the node sensor may comprise the power source and the components necessary for data storage and communication. The auxiliary sensor(s) may receive power and operational instructions from the node sensor, and provide data to the node sensor, in real time or otherwise.

Figure 2:
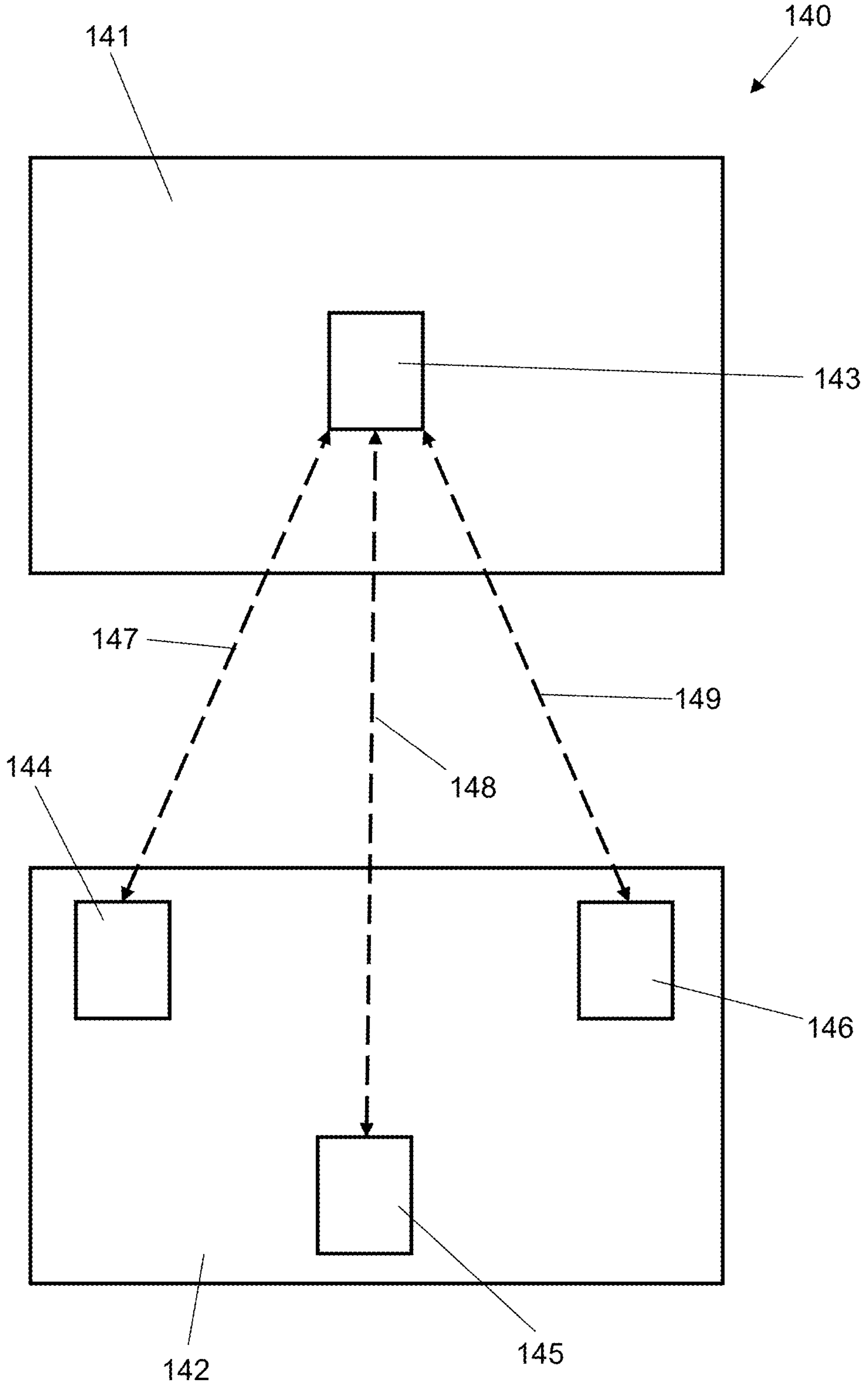
FIG. 2 is a schematic diagram of a first distance sensor shown in FIGS. 1A and 1B.

FIG. 2 is a schematic diagram of the first distance sensor 140 shown in FIGS. 1A and 1B. The first frame sensor member 141 includes a magnet 143. The first door sensor member 142 includes a first Hall effect sensor 144, a second Hall effect sensor 145 and a third Hall effect sensor 146. Each Hall effect sensor 144, 145, 146 is configured to measure a magnitude or strength of a local magnetic field and output a voltage directly proportional to the magnetic field strength. Accordingly, a distance between the magnet 143 and each Hall effect sensor 144, 145, 146 may be inferred by the voltage output by each Hall effect sensor 144, 145, 146. As such, a first distance 147, between the magnet 143 and the first Hall effect sensor 144, a second distance 148, between the magnet 143 and the second Hall effect sensor 145, and a third distance 149, between the magnet 143 and the third Hall effect sensor 146, may be obtained. Through triangulation of the three obtained distances 147, 148, 149, a three-dimensional, or triaxial, distance measurement between the door and the frame may be obtained.

The relative positions of the three Hall effect sensors 144, 145, 146 on the door may be predetermined. The relative position of the magnet 143 on the frame may be predetermined. The first distance sensor 140 may be calibrated upon installation, and periodically thereafter, such that the output voltage of each Hall effect sensor 144, 145, 146 may be accurately converted into a distance. As will be clear from the present disclosure as a whole, the magnet 143 may instead be provided on the door, and the Hall effect sensors 144, 145, 146 may instead be provided on the frame. Furthermore, any number of Hall effect sensors 144, 145, 146 may be provided.

Figure 3:
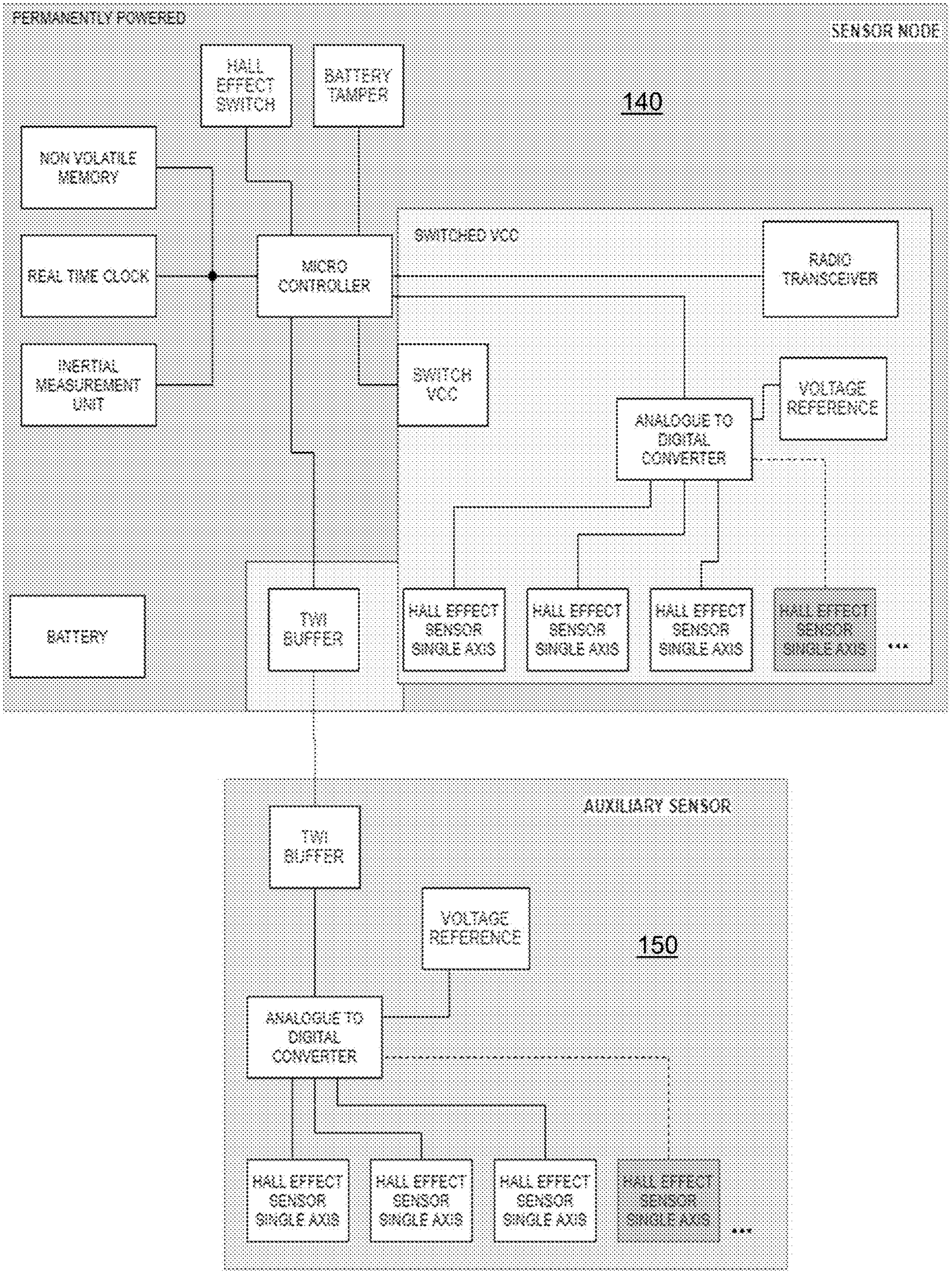
FIG. 3 is a block diagram of the first and second distance sensors shown in FIGS. 1A and 1B.

FIG. 3 is a block diagram of the first 140 and second 150 distance sensors shown in FIGS. 1A and 1B. As shown in FIG. 3, the first distance sensor 140 is a sensor node and the second distance sensor 150 is an auxiliary sensor 150. The first distance sensor 140 includes permanently powered components and switched components arranged to be powered only when required. One permanently powered component is a micro controller arranged to control operation of the system. The micro controller is in communication with non-volatile memory arranged to store the relevant data, a real time clock consultable by the micro controller to obtain a real time value, and an inertial measurement unit configured to provide inertial data to the micro controller such that the micro controller is able to determine when a user opens and closes the door. Additionally, the micro controller is in communication with a battery tamper. The first distance sensor 140 also includes a battery arranged to power each component of the sensors 140, 150.

The micro controller is operable to switch on and off the switched components of the first distance sensor 140, which include at least three Hall effect sensors and an analogue to digital converter with associated voltage reference. The first distance sensor 140 is configured to obtain voltages proportional to the first distance, via the Hall effect sensors, and provide the voltages in digital form to the micro controller. The micro controller may then perform the necessary calculations to determine the first distance. The first distance sensor 140 also includes a switched radio transceiver operable to transmit and receive data wirelessly to and from a user device, as discussed herein.

The second distance sensor 150 includes at least three Hall effect sensors and an analogue to digital converter with associated voltage reference. The second distance sensor 150 is configured to obtain voltages proportional to the second distance, via the Hall effect sensors, and provide the voltages in digital form to the micro controller of the first distance sensor 140 via TWI buffers. The micro controller may then perform the necessary calculations to determine the second distance. The second distance sensor 150 receives power from the first distance sensor 140.

Figure 4:
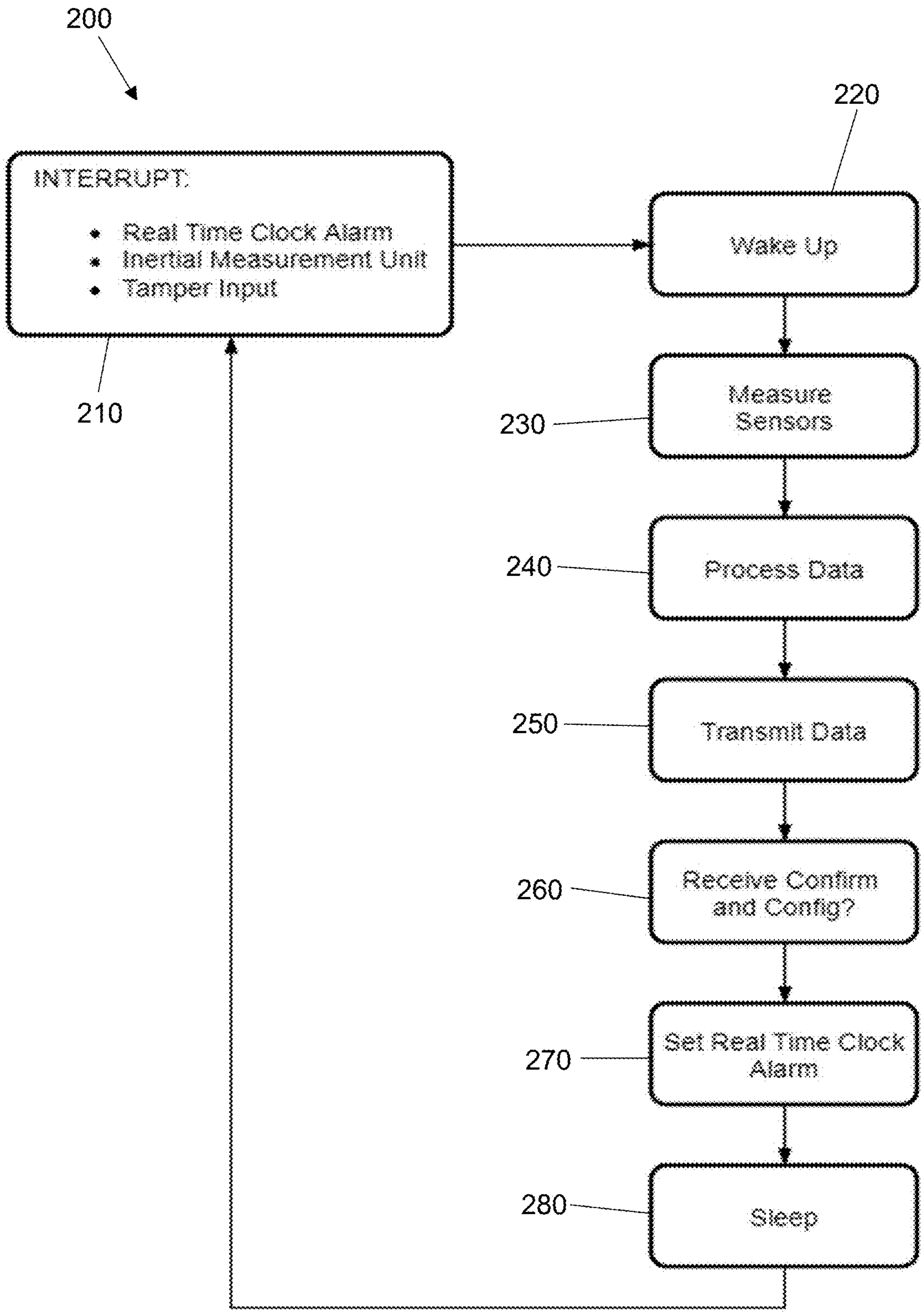
FIG. 4 is an operation flowchart showing the operational steps of the self-testing fire door system shown in FIGS. 1A and 1B.

FIG. 4 is an operation flowchart 200 showing the operational steps of the self-testing fire door system shown in FIGS. 1A and 1B. Interrupts 210 drive data acquisition and wake functions. The interrupt may be, for example, a real time clock alarm, an output from the inertial measurement unit indicating the door has been opened and closed, or the battery tamper unit. Following the interrupt 210, the system is configured to wake up 220. The distance sensors are then configured to measure 230 the respective distance between the door and the frame. The data is then processed 240 and transmitted 250, in the manner described herein. Following the transmittal 250 of the data, the system awaits confirmation of the data being received by the user, such as at the hub described herein. Once the confirmation of receipt has been received 260, the system then sets 270 a real time clock alarm and returns to the sleep 280 mode, awaiting a future interrupt.

The invention claimed is:

1. A self-testing fire door system comprising:

a door frame;

a fire door attached to the door frame via one or more hinges, wherein the fire door is moveable between a closed position, in which the fire door covers an opening in the door frame, and an open position, in which the opening in the door frame is uncovered;

a first distance sensor arranged to measure a first distance between a top portion of a non-hinged side of the fire door and the door frame, wherein the first distance sensor comprises a first sensor member arranged on the door frame and a second sensor member arranged on the fire door adjacent to the first sensor member when the fire door is in the closed position, wherein the first distance sensor and the second distance sensor are in communication via a hardwired connection, and wherein the first distance sensor comprises an analogue to digital converter; and a processor configured to:

measure, via the first distance sensor, the first distance; and output the first distance;

wherein the first distance sensor comprises three Hall effect sensors arranged such that each Hall effect sensor is aligned along different axes to each of the other Hall effect sensors in a triaxial arrangement, wherein the system further comprises a second distance sensor arranged to measure a second distance between a bottom portion of the non-hinged side of the fire door and the door frame, wherein the second distance sensor comprises a first sensor member arranged on the door frame and a second sensor member arranged on the fire door adjacent to the first sensor member when the fire door is in the closed position, wherein the first distance is a first distance between a first surface at the top portion of the fire door and a portion of the frame, and the second distance is a second distance between the first surface at the bottom portion of the fire door and the portion of the frame, and wherein the processor is further configured to detect a warp or twist in the door or frame based on the measured first and second distances.

2. The system of claim 1, wherein the first distance sensor is a node sensor and the second distance sensor is an auxiliary sensor.

3. The system of claim 1, wherein the processor is configured to output the first distance is response to the fire door moving to the closed position.

4. The system of claim 3, wherein the system comprises a closure sensor configured to provide an output when the door is moved to the closed position.

5. The system of claim 3, wherein the system comprises an inertial measurement unit.

6. The system of claim 1, wherein the processor comprises a time keeping unit and the processor is configured to output the first distance after a predetermined time interval.

7. The system of claim 6, wherein the processor is configured to continually output the first distance at regular time intervals, wherein the regular time interval is at least every second.

8. The system of claim 1, wherein the processor is configured to output the first distance to an alert unit, wherein the alert unit is configured to compare the first distance to a predetermined maximum allowable first distance and output an alert if the first distance exceeds the predetermined maximum allowable first distance; and wherein the predetermined maximum allowable first distance is user settable and/or resettable.

9. The system of claim 1, wherein:

the processor is configured to keep a log of each measurement of the first distance; and the processor is Internet-enabled and the log is remotely accessible.

10. The system of claim 1, wherein the processor is configured to calculate a distance between the fire door and the door frame in three dimensions based on triangulation of the signals from the three sensors or based on a vector-based calculation.

11. The system of claim 1, wherein the system further comprises a power source configured to provide power to the first distance sensor and the processor.

12. The system of claim 1, further comprising a hub in communication with the processor, wherein the hub is further configured to communicate with further processors of further self-testing fire door systems.

13. The system of claim 1, wherein the first distance sensor has an operational range of between 5 mm and 20 mm; and wherein the first distance sensor has a resolution of less than 0.05 mm.

14. A method of testing the fire door system of claim 1, the method comprising:

measuring the first distance;

comparing the first distance to a predetermined maximum allowable first distance;

measuring the second distance;

detecting the warp or twist in the door or frame based on the measured first and second distances; and outputting a detection of the warp or twist in the door.

* * * * *